United States Patent [19]
Fleischmann et al.

[11] 4,125,439
[45] Nov. 14, 1978

[54] ELECTROCHEMICAL CELLS AND METHODS OF ELECTROLYSIS

[75] Inventors: Martin Fleischmann, Eastleigh; Robert E. W. Jansson, Hythe; Rodney J. Marshall, Southampton, all of England

[73] Assignee: National Research Development Corporation, London, England

[21] Appl. No.: 801,993

[22] Filed: May 31, 1977

[51] Int. Cl.$^2$ ............................ C25B 1/02; C25B 9/00
[52] U.S. Cl. ...................................... 204/1 R; 204/129; 204/212; 204/222; 204/273
[58] Field of Search .............. 204/212, 222, 261, 1 R, 204/129, 273

[56] References Cited
U.S. PATENT DOCUMENTS 3,196,095  7/1965  Wadsworth ..................... 204/212 X
3,790,464  2/1974  Greaves ............................. 204/212

FOREIGN PATENT DOCUMENTS 1,278,591  6/1972  United Kingdom ..................... 204/212

Primary Examiner—G. L. Kaplan
Attorney, Agent, or Firm—Cushman, Darby & Cushman

[57] ABSTRACT

A process of diaphragmless electrolysis comprises providing an electrochemical cell having substantially parallel electrodes in the form of discs axially spaced from each other and connected for common rotation about their axis, one of the discs having means defining a central opening, causing common rotation of the electrodes, introducing matter to be electrolyzed through said central opening, adjusting the speed of rotation until the profile of velocity of effective radial flow between the discs shows a double-humped distribution, and applying a potential between the discs.

3 Claims, 9 Drawing Figures

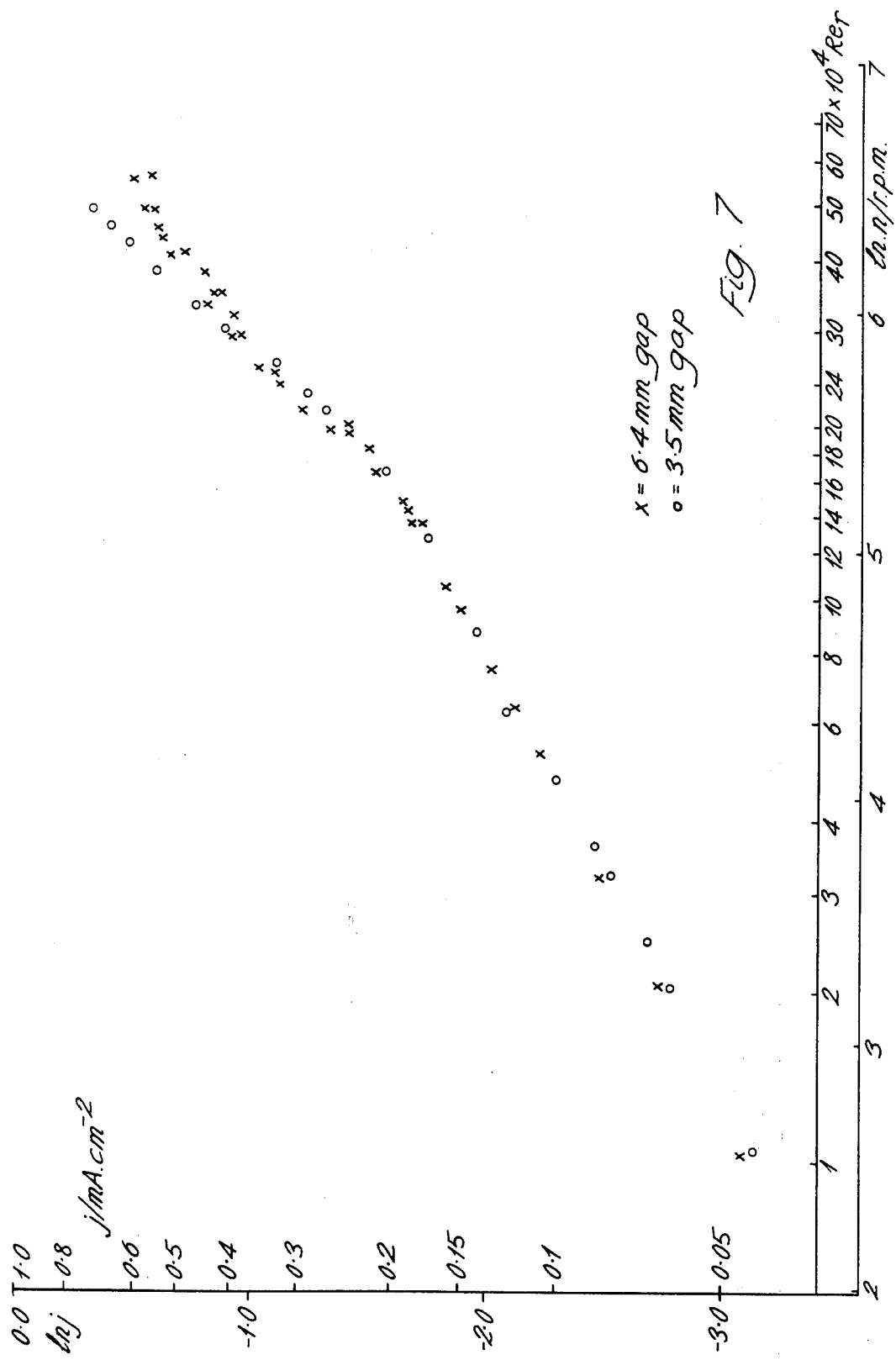

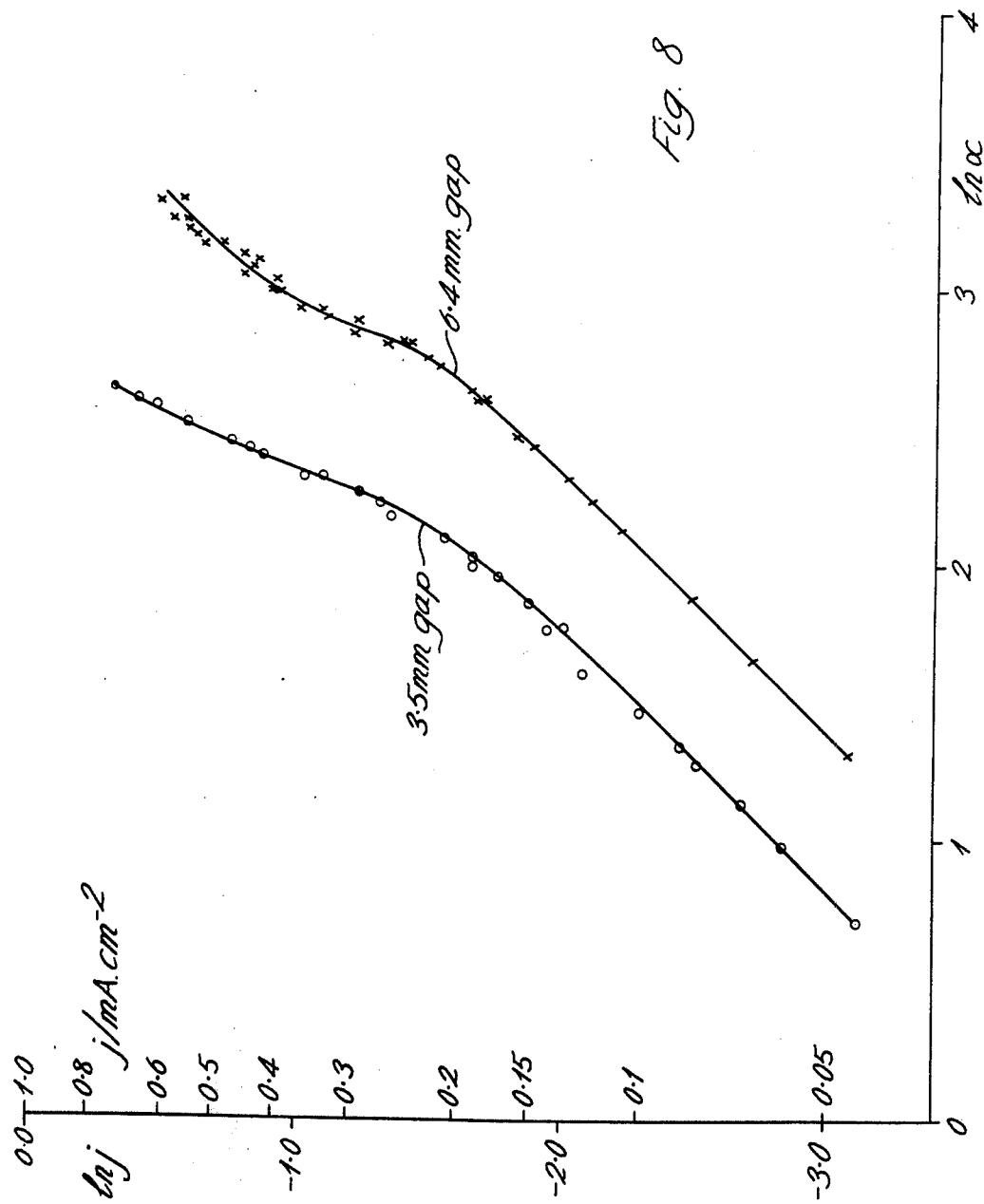

ELECTROCHEMICAL CELLS AND METHODS OF ELECTROLYSIS

This invention relates to electrochemical cells particularly suitable for use as electrolysers. Electrochemical cells are known in which solutions to be electrochemically treated are made to pass radially or radially and tangentially between spaced plate electrodes one of which, in some cells, may be arranged to be rotated relatively to the other or the two may be in contra-rotation. Such cells have distinct uses but it has now been appreciated that benefit can arise from rotation of the plates as a unit so that in effect the moving unit might be said to be acting as a pump to cause outward flow of the solution. This arrangement can be made to operate under particularly advantageous conditions as will be explained below.

In accordance with the present invention, an electrochemical cell comprises spaced, substantially parallel, electrodes in the form of discs or the like spaced from each other by an operational spacing as hereinafter defined and connected for common rotation about an axis substantially at right angles to the, or the general, planes of the discs or the like, one at least of said discs or the like having a central opening through which electrolyte and/or reaction material is introduced to the space between the discs or the like. It may be advantageous if the discs are adapted for a rotation at a speed substantially up to the speed at which the electrolyte and/or reaction material begins to flow between the discs or the like in turbulent manner since this will give maximum flexibility of adjustment of operating conditions.

By 'operational spacing' is meant a spacing such that, at the particular speed of rotation, the profile of velocity of effective radial flow between the discs or the like at increasing radii shows a double-humped distribution such as that disclosed theoretically by F. Krieth in Int. J. Heat Mass Transfer, 9, 265–282 (1966). It would appear that the gap-to-radius ratio is the most important parameter for inducing the flow conditions whereas the inverse gap is important for the electrochemical reactions. It is considered that an optimum gap would probably lie between about 0.2 and 10 mm for electrolysers of sensible size.

Although the radial velocity gradient is greater near the disc wall than would be expected in radial channel flow, the tangential velocity gradient appears to be even higher, so mass transfer is dominated by the rotation. Gap, rate of rotation and disc radius may than be used to optimise mass transfer rate and mean mass velocity.

Although the discs or the like, which will act as the electrodes of the cell, are referred to above in terms which may indicate planarity, it is to be understood that one or both may be non-planar up to a degree of non-planarity which will very readily become obvious during experimental operation of the cell; if, by the degree of non-planarity, the required velocity distrubution as defined above cannot be achieved, then the non-planarity must be changed. The rotational axis may be arranged at any convenient angle from the horizontal to vertical inclusive.

It is evident that, on account of the double-humped velocity distribution, two spaced streams of electrolyte and/or reactant will be passing radially (and tangentially) between the discs or the like towards the outer edges. This effects may be used to achieve substantial separation of anolyte and catholyte in the cell so that the outgoing one can be directed, collected or used substantially independently of the other.

Although it is probably desirable that the two discs or the like should be substantially of equal diameter, it is not ruled out, at least at this stage, that they need to be of equal diameter; nor, in fact, need they be circular in outer configuration but it is probably essential, from the point of preferentially not upsetting substantial streamline motion of the two streams, that the outer edge is substantially circular in the case of both electrodes.

According to a feature of the invention annular splitter means may be arranged at the periphery of the discs, or at least of the smaller disc, by which the anolyte may be separated from the catholyte. By this means it is possible to conduct diaphragmless electrolysis of water, and of organic or inorganic chemicals while providing for separation of the product streams within the cell.

The disc with central entry hole for the electrolyte and/or reactant(s) may serve to allow a drive shaft to pass therethrough to support the cell from the other disc, but there are obvious alternatives and these are illustrated in the accompanying drawings to which reference will now be made.

BRIEF DESCRIPTION OF THE DRAWINGS

FIGS. 7 and 8 are graphs plotting the values obtained for various gap settings between the anode and cathode using the apparatus of FIG. 1.

FIGS. 1 to 5 show several alternative drive and mounting arrangements. In these Figures, the cell comprises disc $a$, as anode, which is supported on a metal shaft driven by an electric motor $e$. Connection to the anode is through the shaft by means of a slip ring $f$. The cathode $b$ is a disc with central hole which is supported from the anode disc by insulated pillars $c$ situated at convenient radii; the slip ring $f$ for connection to the cathode is also carried by the shaft but is insulated therefrom. The cell is shown in FIGS. 1 and 2 as being held within a bath of reactant. In the cell of FIG. 2 the lower electrode disc is solid and the anode disc has the central hole through which reactant is induced to flow to pass between the discs. Annular flow splitters $g$ are shown in FIGS. 3, 4 and 5 and the latter two figures illustrate arrangements using a sliding seal $s$ in which the central hole in the one disc co-operates with a tube $t$, which may be a hollow drive shaft (FIG. 5); reactant will then be supplied to the cell through this tube, thus reducing the amount of reactant required. The rate of supply of reactant can be adjusted not only by the anode/cathode gap, viscosity or speed or revolution of the assembly, etc, but also by an optional pump $p$, which can apply a positive pressure or a negative pressure, as desired. FIG. 5 shows an annular splitter $g'$ in the form of a shroud just projecting beyond the plane of the anode.

FIG. 6 illustrates an arrangement in which several cells are driven from a common horizontal shaft; bipolar connections to such an arrangement would reduce the number of slip rings required for connection to the electrodes. Anolyte and catholyte streams from a multiple cell arrangement could be collected from common manifolds and, if desired, processed; possibly the electrolyte with or without reactant could be returned to the cells although this possibility would be common to all cell arrangements in accordance with the invention.

Reference to the Krieth work mentioned above will show that the presence of the double-humped velocity distribution is determined by the Taylor number $\alpha$ (where $\alpha^2 = \omega^2/\nu$, $\omega$ being angular velocity, and $\nu$ hydrodynamic viscosity in accordance with normal usage). However, the mass transfer to the surface is determined by the rotational Reynold's number $Re_r (= \omega r_o^2/\tau)$. This is illustrated in FIGS. 7 and 8 of which FIG. 7 shows results for electrolysis of $10^{-3}$ M ferro/ferri cyanide in 0.1 M sodium hydroxide using a cell of FIG. 1 configuration in which the disc diameter was 175 mm., the small hole in the cathode being 44 mm. diameter and the gap being 6.4 mm. for one run and 3.5 mm for the other, the electrodes being nickel. The plots for the two gap settings show that mass transfer rate as shown by the current density becomes independent of gap. It might be of interest to note the inflexion which appears at $Re_r$ equals about $2 \times 10^5$, this showing the onset of transitional flow which can be demonstrated by laser anenometer tests which indicate unsteadiness in the velocity in that region. At about $5 \times 10^5$ almost fully developed turbulent flow exists over the discs.

The separation of the two sets of plots for the different gaps in FIG. 8 shows that there is gap dependence when the results are correlated by Taylor number for the same electrolyte and gap settings as for FIG. 7.

Figure 1:
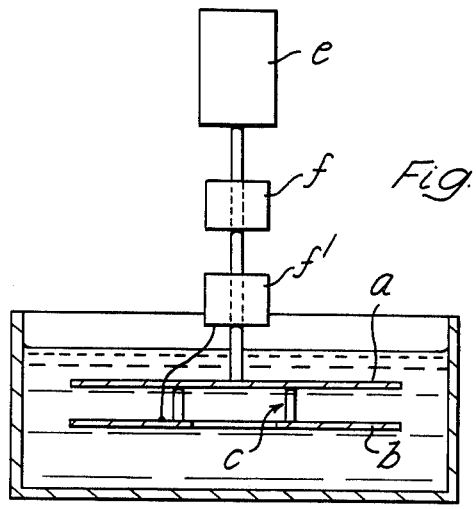
FIG. 1 is a plane cross-sectional view of one embodiment of the invention in which the anode is attached to the drive shaft.
Figure 2:
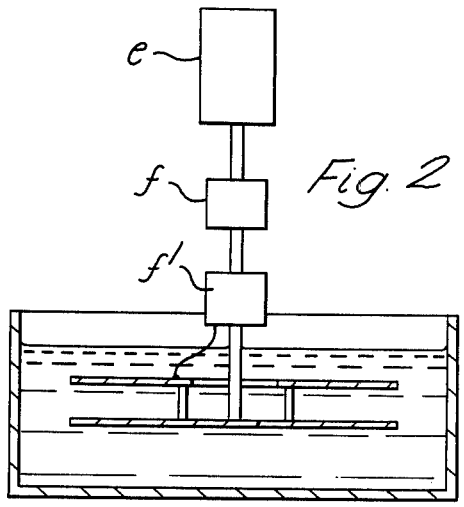
FIG. 2 is a plane cross-sectional view of another embodiment of the invention in which the cathode is attached to the drive shaft.
Figure 1A:
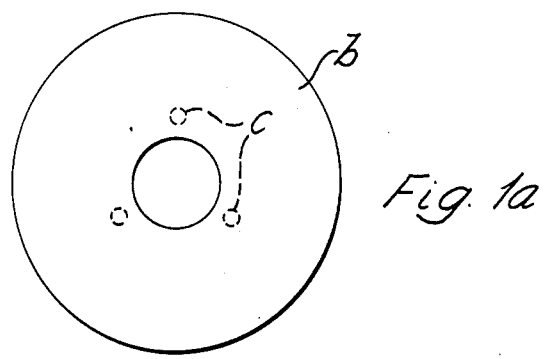
FIG. 1a is an elevated view of the cathode of FIG. 1.

In one particular cell on the lines of the FIG. 1 configuration, the discs were 135 mm. diameter spaced at a distance of 4 mm., the hole in the cathode being 25 mm. diameter and operating this cell at up to 230 rpm with the same electrolyte as mentioned for the FIGS. 7 and 8 tests, it can be shown that substantially complete separation of anolyte and catholyte takes place.

Scaling up from the data represented by FIG. 8, an electrolysis in a cell like this of 28 percent NaOH would produce approximately 1300 m³ of hydrogen at NTP per square meter per hour.

As compared with known electrolysers, which rely on a membrane separator, this represents an advantage since the voltage loss common with known electrolysers is higher than expected for use of a cell according to the invention. It would be beneficial to use high pressures and high temperatures when operating an electrolyser for hydrogen production. Conditions and dimensions can be chosen to avoid any possible disadvantage which might arise from gas blanketing of the electrodes.

Figure 3:
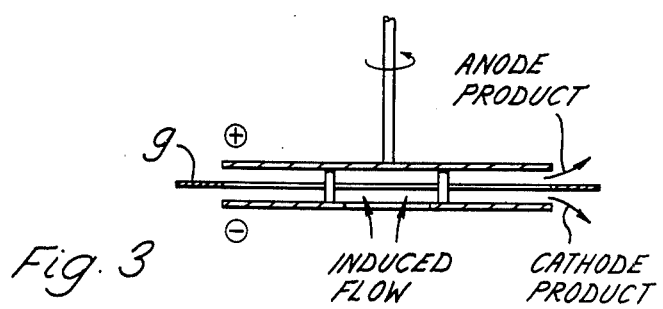
FIG. 3 is a cross-sectional detailed view of the rotating electrodes of FIG. 1 illustrating the induced flow, anode and cathode products between an annular flow splitter.
Figure 4:
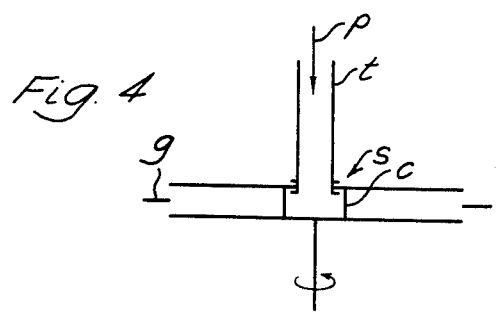
FIGS. 4 and 5 are cross-sectional schematic views of rotating electrodes showing different embodiments of the invention in which a hollow drive shaft is used.
Figure 5:
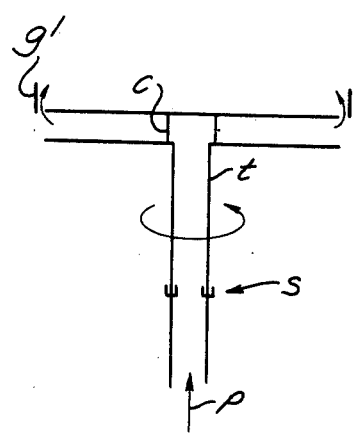
Figure 6:
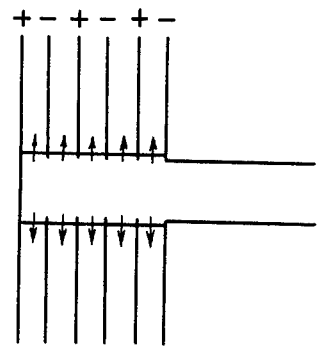
FIG. 6 is a plan cross-sectional view of yet another embodiment of the invention showing rotating electrodes in which several cells are driven from a common horizontal shaft.

The particular splitters shown in FIGS. 3 and 4 can be modified for example as shown in FIG. 5 to take the form of a fairing or shroud about the anode or cathode (the electrolyte from whichever of which is to be collected) having an opening which is for example 2 mm greater in diameter than the diameter of the disc, and which is either coplanar with the disc or only just envelopes the disc. This exploits the finding (using microprobes, indicator materials etc) that anolyte (or catholyte) flows within a fraction of a mm of its electrode to the periphery of the disc and then tends to flow axially, or with an axial component, away from the other electrode.

A shroud of this type can be fitted to each of the anode or cathode, if desired. The shroud(s) can rotate with the discs but need not do so.

In electrochemical reactions wherein gas is evolved, it has gratifyingly been found that evolution of bubbles at moderate rates (e.g. corresponding to current densities of 1 to 100 mA/cm²) from a rotating electrode does not upset the smooth flow pattern of electrolyte.

The invention will now be described by way of example.

Two insulating discs were made, both having a radius of 76 mm. On each disc, a flat copper annulus was cemented, having an outer radius of 76 mm and a width across the thickness of the annulus of 38 mm. The discs were mounted as shown in FIG. 1. The cathode $b$ had a central hole of radius 11 mm. Three symmetrically spaced pillars $c$ held the discs together with a gap of 1.7 mm. The pillars were as close to the centre as practicable, to minimise disturbance to outward flow of material through the gap.

A dilute copper sulphate solution was used as the electrolyte. A voltage was set up between the anode and cathode sufficient to cause 1A of current to flow. Meanwhile, the assembly $a$, $b$, $c$ was set in rotation at 100 rpm by the motor. Microprobes set up to monitor the copper concentration showed that $Cu^{++}$ created at the anode moved centrifugally outwards, remaining within 0.5 mm of the anode. The pillars were sufficiently near the centre so that electrolyte flowing outwardly was flowing in a quiescent mode by the time it reached the annular electrode region.

We claim:

1. A process of diaphragmless electrolysis, comprising
   providing an electrochemical cell having substantially parallel electrodes in the form of discs axially spaced from each other and connected for common rotation about their axis, one of the discs having means defining a central opening,
   causing common rotation of the electrodes,
   introducing matter to be electrolysed through said central opening,
   adjusting the speed of rotation until the profile of velocity of effective radial flow between the discs shows a double-humped distribution, and
   applying a potential between the discs.

2. The electrolysis process of claim 1 including the additional step of
   separating the anolyte from the catholyte.

3. An electrochemical cell having
   substantially parallel electrodes in the form of discs axially spaced from each other and connected for common rotation about their axis, one of the discs having means defining a central opening,
   rotation means for rotating the electrodes at a speed whereat the profile of velocity of effective radial flow between the discs shows a double-humped distribution,
   a container surrounding the electrodes permitting fluid contents to be electrolyzed to be introduced through said central opening,
   energizing means for applying a potential between the discs and
   annular splitter means arranged at the periphery of the discs, by which anolyte may be separated from catholyte.

* * * * *